(12) United States Patent
Chiaroni et al.

(10) Patent No.: US 9,531,495 B2
(45) Date of Patent: Dec. 27, 2016

(54) HIGH CAPACITY NETWORK NODE

(71) Applicant: Alcatel Lucent, Boulogne Billancourt (FR)

(72) Inventors: Dominique Chiaroni, Nozay (FR); Herbert Haunstein, Stuttgart (DE); Sophie Etienne, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/400,704

(22) PCT Filed: Apr. 25, 2013

(86) PCT No.: PCT/EP2013/058579
§ 371 (c)(1),
(2) Date: Nov. 12, 2014

(87) PCT Pub. No.: WO2014/019721
PCT Pub. Date: Feb. 6, 2014

(65) Prior Publication Data
US 2015/0188657 A1   Jul. 2, 2015

(30) Foreign Application Priority Data
Jul. 30, 2012  (EP) .................................... 12305931

(51) Int. Cl.
*H04J 14/00*   (2006.01)
*H04J 14/02*   (2006.01)
*H04Q 11/00*   (2006.01)

(52) U.S. Cl.
CPC .......... *H04J 14/0212* (2013.01); *H04J 14/021* (2013.01); *H04Q 11/0003* (2013.01);
(Continued)

(58) Field of Classification Search
CPC  H04J 14/0283; H04J 14/0212; H04J 14/0204; H04J 14/0213; H04Q 11/0005
(Continued)

(56) References Cited

U.S. PATENT DOCUMENTS

2002/0054602 A1*  5/2002  Takahashi ............. H04L 49/103
                                                   370/412
2002/0131112 A1*  9/2002  Hait ................... H04B 10/2513
                                                   398/201
(Continued)

FOREIGN PATENT DOCUMENTS

EP   1241913   9/2002
EP   2458761   5/2012
(Continued)

OTHER PUBLICATIONS

Hattori, K. et al.; Proposal of Optical L2 Switch Network; IEICE Technical Report PN2013-3; Japan; The Institute of Electronics, Information and Communication Engineers, Jun. 14, 2012; vol. 112; No. 67; pp. 13-18.
(Continued)

*Primary Examiner* — David Payne
*Assistant Examiner* — Pranesh Barua
(74) *Attorney, Agent, or Firm* — Patti & Malvone Law Group, LLC (57) ABSTRACT

An exemplary technique is provided for a scalable architecture for a network node that allows a very high switching capacity. The network node has a number of packet optical add drop multiplexers (POADMs), a number of dual line cards, respectively associated with the POADMs, and an optical switch matrix. Each POADM has an input and an output line interface and serves to selectively add and drop optical packets into and from packet timeslots of output and input wavelength-multiplexed optical signals transmitted (Continued)

and received at said output and input line interfaces, respectively. The dual line cards serve to electrically process and buffer packets to be added and dropped. The optical switch matrix configurably interconnects internal optical interfaces contained within the dual line cards on a packet by packet basis.

13 Claims, 7 Drawing Sheets

(52) U.S. Cl.
    CPC ..... *H04Q 11/0005* (2013.01); *H04Q 11/0066* (2013.01); *H04Q 2011/0016* (2013.01); *H04Q 2011/0039* (2013.01); *H04Q 2011/0052* (2013.01); *H04Q 2011/0069* (2013.01)

(58) Field of Classification Search
    USPC .......................................... 398/48, 45, 83, 43
    See application file for complete search history.

(56) References Cited

U.S. PATENT DOCUMENTS

| | | | |
|---|---|---|---|
| 2002/0131118 A1* | 9/2002 | Chiaroni | H04J 14/0204 398/83 |
| 2003/0193955 A1* | 10/2003 | Beshai | H04J 14/0241 370/395.4 |
| 2004/0184709 A1* | 9/2004 | Kubby | G02B 6/3508 385/16 |
| 2005/0152348 A1* | 7/2005 | Youn | H04J 3/1617 370/360 |
| 2006/0165070 A1* | 7/2006 | Hall | H04L 49/101 370/369 |
| 2006/0268909 A1* | 11/2006 | Langevin | H04L 49/15 370/405 |
| 2009/0324243 A1* | 12/2009 | Neilson | H04Q 11/0005 398/154 |
| 2012/0183293 A1* | 7/2012 | Zami | H04Q 11/0005 398/48 |
| 2012/0195595 A1* | 8/2012 | Bogoni | H04J 14/08 398/49 |
| 2012/0213220 A1* | 8/2012 | Troan | H04L 45/741 370/389 |
| 2013/0266309 A1* | 10/2013 | Binkert | H04L 49/253 398/19 |

FOREIGN PATENT DOCUMENTS

| | | | |
|---|---|---|---|
| FR | WO2011039443 | * | 4/2011 |
| JP | 2012029156 | | 2/2012 |

OTHER PUBLICATIONS

Chiaroni, D. et al; Packet OADMS for the Next Generation of Ring Networks; Bell Labs Technical Journal, Wiley, CA, US; vol. 14, No. 4; Jan. 4, 2010; pp. 265-283; XP001552054; ISSN: 1089-7089, DOI: 10.1002/BLTJ.20415; [retrieved on Feb. 23, 2010].

* cited by examiner

HIGH CAPACITY NETWORK NODE

FIELD OF THE INVENTION

The present invention relates to the field of telecommunications and more particularly to a high capacity network node for use in optical networks.

BACKGROUND OF THE INVENTION

In switched optical networks, network nodes are needed, which can flexibly switch high amounts of high speed data signals between a large number of input and output ports. Today, optical interfaces are commercially available for signal rates of up to 100 Gbit/s. The overall traffic capacity large network nodes can handle today is in the range of up to few terabit per second. Such network nodes are based on high-speed electrical signal switching.

Another approach is based on optical packet switching technology. An optical Add/Drop-Multiplexer for packet traffic, referred to as Packet OADM, has been described in the article "Packet OADMs for the Next Generation of Ring Networks" by D. Chiaroni et al, Bell Labs technical Journal 14(4) 2010, pages 265-284, which is incorporated by reference herein. A Packet OADM is designed for ring applications.

Another high capacity switching system, which has a number of I/O subsystems interconnected through a central space switch driven at a higher rate than the line rate is described in EP2337372A1. The central space switch of this system can be an optical WDM ring, which interconnects all I/O subsystems and where different I/O subsystems transmit and receive at different wavelengths.

SUMMARY OF THE INVENTION

It is therefore an object of the present invention to provide a scalable architecture for a network node that allows a very high switching capacity.

These and other objects that appear below are achieved by a network node which has a number of packet optical add drop multiplexers/POADMs/, a number of dual line cards, respectively associated with the POADMs, and an optical or electrical switch matrix.

Each POADM has an input and an output line interface and serves to selectively add and drop optical packets into and from packet timeslots of output and input wavelength-multiplexed optical signals transmitted and received at said output and input line interfaces, respectively. The dual line cards serve to electrically process and buffer packets to be added and dropped. The dual line cards have a line interface portion for dropped packets to be forwarded on line interfaces associated with any other of the line cards and a client interface portion for packets to be added from or dropped at a client interface. The line interface portion has an internal optical interface for the packets to be forwarded. The optical or electrical switch matrix configurably interconnects these internal optical interfaces on a packet by packet basis.

BRIEF DESCRIPTION OF THE DRAWINGS

Preferred embodiments of the present invention will now be described with reference to the accompanying drawings in which FIG. 1 an embodiment of a network node which utilizes POADMs as line interfaces.

DETAILED DESCRIPTION OF THE INVENTION

The embodiments provide a node architecture of an optical packet switch for mesh topologies. This node architecture is capable to address more than 1 Petabit of capacity and exploits dynamic optical bypasses.

More particularly, the architecture exploits POADM (packet optical add drop multiplexer) technology for the dynamic optical bypass in a multi-connectivity node configuration.

In a preferred embodiment, the POADMs are integrated on lines cards using PIC (photonic integrated circuit) technology or any other suitable integrated technology.

The line cards provide an input-output queuing scheme for the central switching stage, which can be implemented using a WDM switching fabric. Alternatively, for smaller nodes the central switching stage can also be implemented using an electrical space switch matrix, thus avoiding internal E/O/E conversion.

Figure 1:
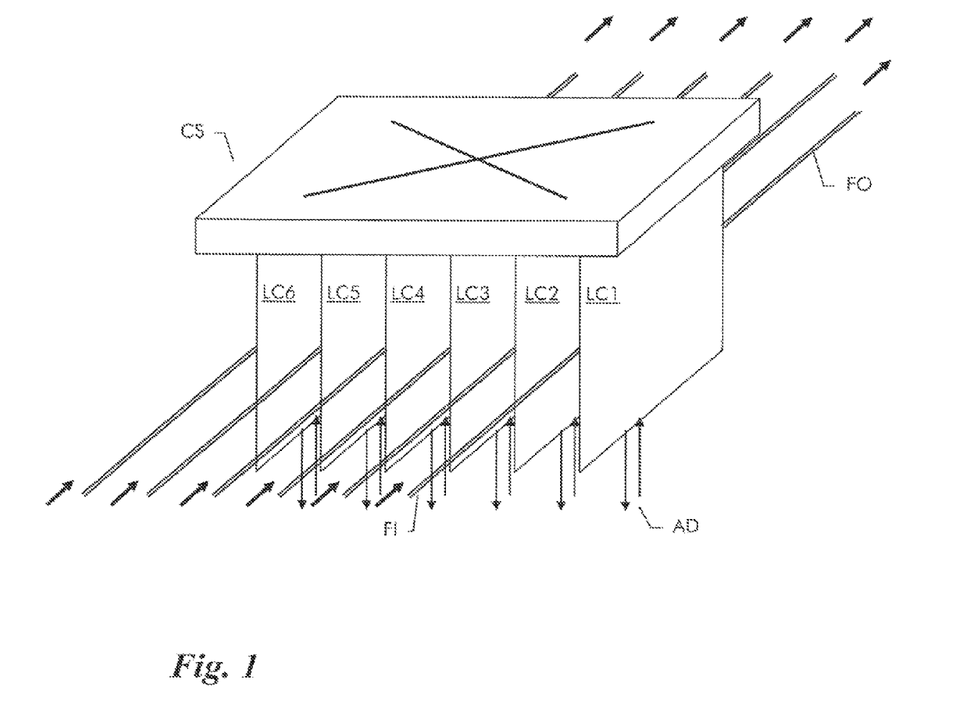

A network node for an optical transmission network is schematically depicted in FIG. 1. The optical node has a number of line cards LC1-LC6. Each line card LC1-LC6 has line ports for a fiber input FI and a fiber output FO, one or more add/drop ports AD and is connected to a central switch matrix CS.

Each line card is equipped with a WDM packet optical add drop multiplexer (POADM) and receives and transmits a WDM line signal at its line ports. The line cards hence implement a transparent optical layer, which operates at packet granularity. This allows to bypass in the optical layer any traffic that does not need to be processed.

At each line card LC1-LC6, traffic can be dropped through the WDM POADM and either crossconnected through central switch matrix SM to any other line card or dropped at one of the add/drop ports AD. Conversely, at each line card, traffic from any other line card crossconnected through central switch matrix CS or traffic from any of its add/drop ports AD can be added to the WDM line signal.

In an embodiment, the WDM line signals have a synchronous multi-wavelength packet format. This is shown schematically in FIG. 2. The WDM line signal has a number of kn data wavelengths $\lambda_1$-$\lambda_n$, $\lambda_{n+1}$-$\lambda_{2n}$, . . . , $\lambda_{kn}$ plus one control wavelength $\lambda_C$. The data wavelengths are grouped in k groups, each having n wavelengths. All data wavelengths $\lambda_1$-$\lambda_{kn}$ as well as the control wavelength are structured into equidistant timeslots, synchronized over all wavelengths. Each group of data wavelengths carries one packet per timeslot, which are therefore termed multi-colour packets. The corresponding timeslot of the control wavelength carries the packet headers of all k packets. In particular, referring to FIG. 2, wavelengths $\lambda_1$-$\lambda_n$ of wavelength group 1 carries in four consecutive timeslots packets P11, P21, P32, P41; wavelength group 2 carries in wavelengths $\lambda_{n+1}$-$\lambda_{2n}$ packets P12, P22, P32, P42; and so on up to wavelength group k, which carries on wavelengths $\lambda_{(k-1)n+1}$-$\lambda_{kn}$ packets P1k, P2k, P3k, P4k.

Figure 2:
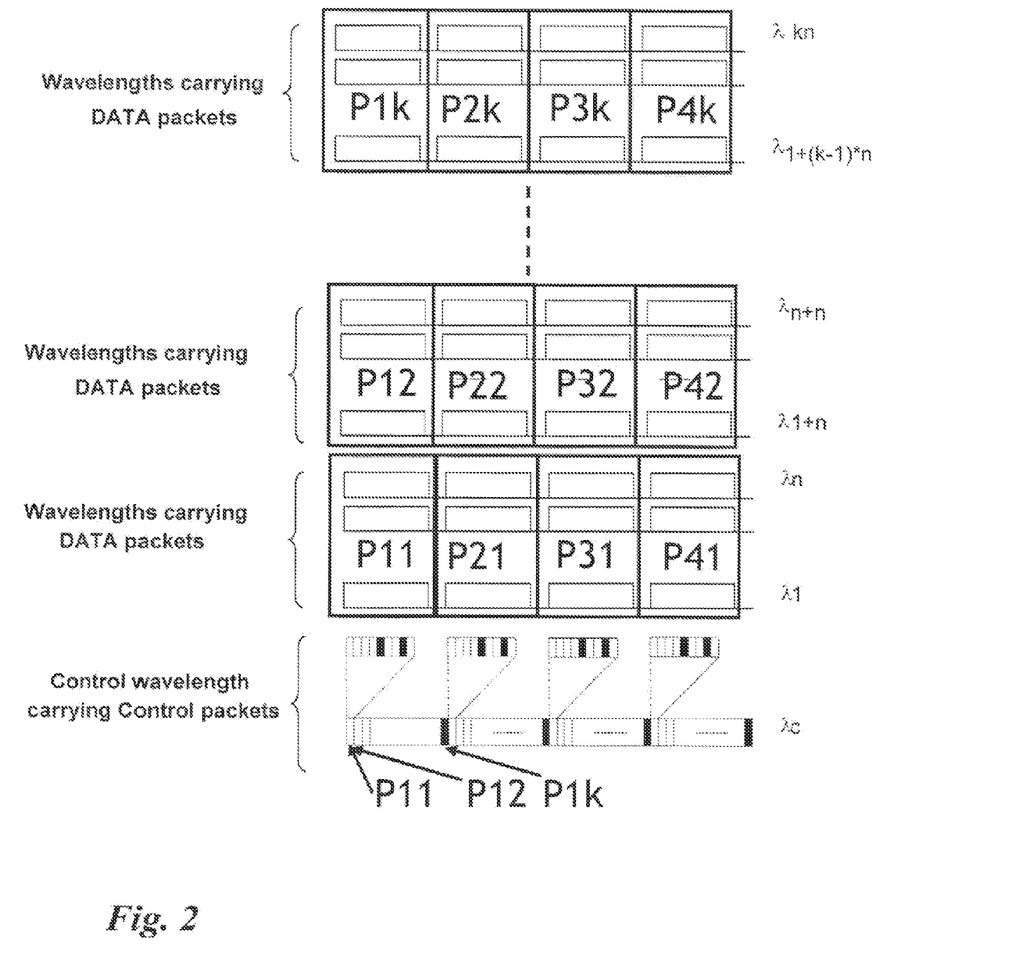
FIG. 2 shows a synchronous multi-colour optical packet format.

In an embodiment, each packet uses a group of 10 wavelengths. So, in a typical wavelength spectrum with 80 wavelengths, there are 8 groups of 10 wavelengths, each, and 8 multi-colour packets are transmitted simultaneously. Moreover, the control channel $\lambda_C$ that carries the packet headers has 8 packet headers per timeslot corresponding to the 8 groups of wavelengths.

Figure 3:
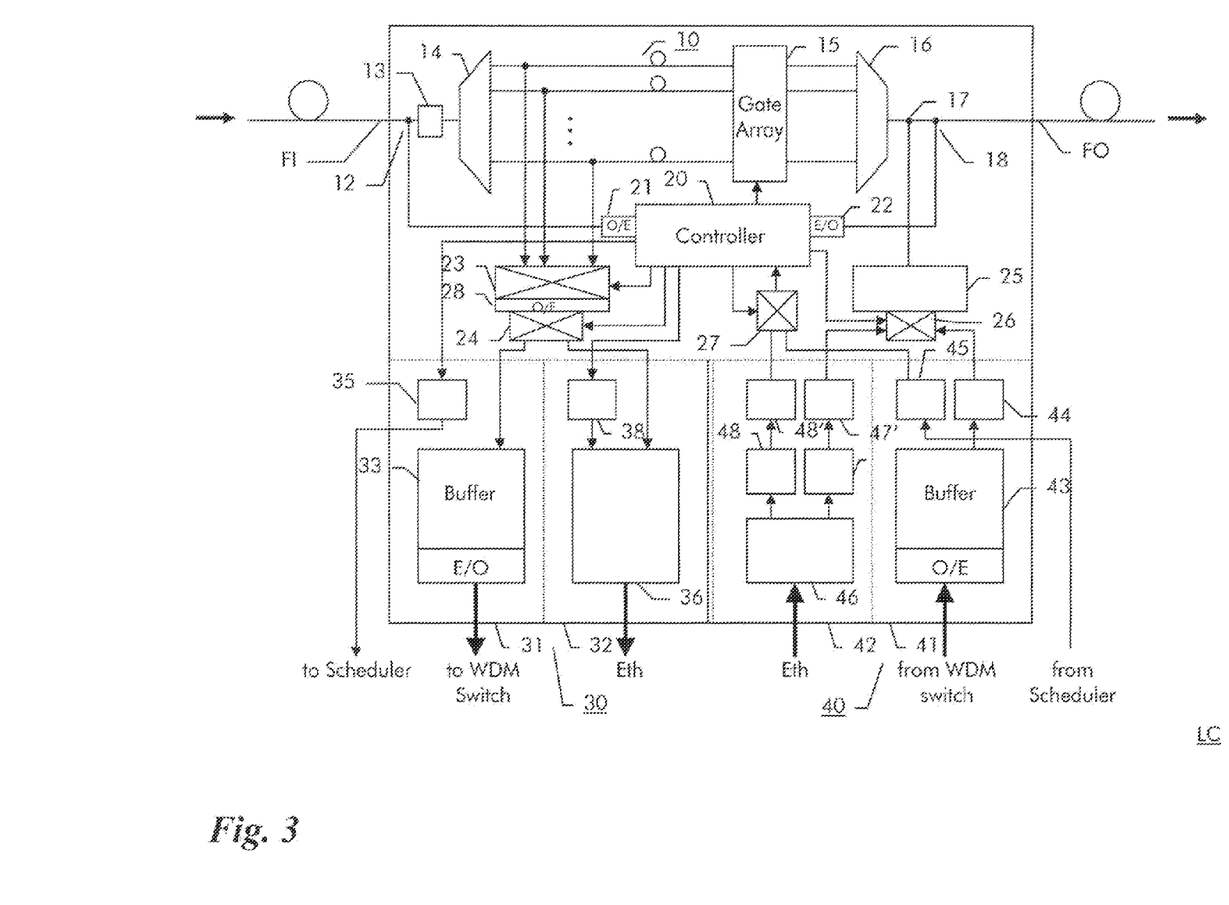
FIG. 3 shows a block diagram of POADM line card used in the network node of FIG. 1.

FIG. 3 shows a block diagram of a line card LC used in the network node of FIG. 1. The line card contains an packet optical add/drop multiplexer (POADM) portion 10 with a fiber input FI and a fiber output FO, a dual receiver section 30, a dual transmitter section 40, and a controller 20.

The POADM portion 10 contains a WDM waveband demultiplexer 14 optically connected to a WDM waveband multiplexer 16, and a gate array 15 arranged between the waveband outputs of WDM waveband demultiplexer 14 and the waveband inputs of WDM waveband multiplexer 16. WDM waveband demultiplexer 14 serves to separate optical wavelength sub-bands which corresponds to the wavelength groups of the optical packet format. WDM waveband demultiplexer 14, gate array 15, and WDM waveband multiplexer 16 form an optical pass-through section between the fiber input FI and the fiber output FO, which can transparently pass optical signals, that do not need to be dropped.

Before the WDM signal from fiber input FI enters WDM waveband demultiplexer 14, a branch 12 splits off a portion of the received WDM signal and feeds it via an O/E converter 21 to controller 20. The remainder of the WDM input signal is fed via a delay element 13, which can be implemented through an optical fiber loop of maybe 200 m length, to the WDM input of WDM waveband demultiplexer 14.

Branch 12 serves to extract the control channel $\lambda_C$ and feeds it to controller 20. Delay element 13 delays the signal channels $\lambda_1$-$\lambda_n$ to allow the controller sufficient processing time to process control channel $\lambda_C$ before the signal channels $\lambda_1$-$\lambda_{kn}$ enter WDM waveband demultiplexer 14.

Controller 20 terminates the control channel $\lambda_C$ and generates a refreshed and updated control channel signal, which is fed via an E/O converter 22 and a coupler 18 to the pass-through WDM signal that is transmitted at fiber output FO.

Gate array 15 is controlled by controller 20 to selectively block individual complete wavelength sub-bands per timeslot in the pass-through WDM signal to free these from optical packets to be dropped. The gate array can be implemented with 8 SOAS (semiconductor optical amplifier) for the 8 wavelength sub-bands corresponding to the 8 groups of wavelengths used for the multi-colour packets.

An alternative implementation of the gate array can be based on fast variable optical attenuators (VOAs). The insertion loss could then be compensated by a single broadband EDFA.

Idle timeslots will be filled with dummy packets in order to avoid signal gaps. This makes the optical packet signals compatible with the existing amplifier infrastructure, i.e. mainly EDFAs, which could otherwise show gain variations. For example, if a packet is dropped and the corresponding timeslot in the transit direction will remain idle, i.e. will not be filled with a new packet, the original packet will not be blocked but can simply remain in the idle timeslot in transit direction and the timeslot is declared idle in the corresponding control channel.

Between demultiplexer 14 and gate array 15, each individual wavelength sub-band is branched to an optical switch 23, which can be configured by controller 20 to select the correct wavelengths of any group of wavelengths in drop direction. The output of optical switch 23 is fed to O/E interfaces 28, which perform O/E conversion, clock data recovery and digital signal processing to regenerate the electrical signals. The O/E conversion is preferably based on coherent optical detection technology. The O/E converted electrical signals are fed to a N×2 electrical switch 24, which switches the individual packets between two portions of dual receiver section 30, depending on whether the respective packet is to be dropped to a client interface or forwarded on a different fiber via another line card of the network node. Electrical switch 24 may also contain electronic buffers that are used to solve contentions when accessing subsequent blocks 33 or 36. The output of switch 24 are the electrical packets to be dropped from the input time-slotted WDM signal.

Optical switch 23 can be designed for fast switching on a per packet basis and can be configured by controller 20 on a per packet basis to drop packets from any of the sub-bands. In this case, optical receivers 28 will be tunable to flexibly convert packets at any wavelength.

As an alternative, optical switch 23 can be used for Traffic Engineering purposes e.g. adaptation of the physical resource to a new traffic profile on a semi-permanent basis. Traffic engineering allows to allocate the wavelengths in an optimized way in the network. For example, if a node needs to increase its capacity, the operator can have a need to re-optimise the wavelength attribution per node. In that case, a level of flexibility is needed in each node, to re-select a new wavelength sub-band. This is not done at the packet level. It is a pre-allocation of the wavelengths for the node.

In the embodiment, optical switch 23 is used for traffic engineering purpose and the switching time is not time critical.

The left-hand portion 31 of the dual receiver section 30 performs the network interface function for packets to be forwarded on other fibers. From switch 24, packets to be forwarded are fed to a packet buffer block 33, which contains buffer memories which temporarily store packets to resolve contentions in the central switch matrix CS. The corresponding headers that belong to these packets will be send from controller 20 to a header processing block 35, which has an output to a central scheduler.

At the output side, packet buffer block 33 contains an optical interface to convert the packets to an internal optical packet format and send these to a central WDM switch for interconnection with other line cards.

It should be noted that the internal packet format used between line cards and the central switch matrix does not need to be the same as the external multi-colour packet format. Internal optical packets can have either single-wavelength or multi-wavelength format.

Packets to be dropped at a client interface are fed from switch 24 to the right-hand portion 32 of the dual receiver section 30. Packet headers are received at a header processing block 38, which formats the headers to generate valid Ethernet output headers.

The formatted headers and received data packets are fed to a output packet processor 36, such as an Ethernet network processor, which temporarily stores the headers and data and generates valid Ethernet frames for output at an Ethernet interface to a connected client.

Similarly, dual transmitter section 40 contains a client interface portion 42 and a network interface portion 41.

The client interface portion 42 has an Ethernet interface for client data signals. Received Ethernet frames are stored in a buffer memory 46, where they are arranged in queues per class of service. A mapper circuit 47 creates time slots with encapsulated Ethernet frames per class of service and per destination. Header processor 48 processes the corresponding Ethernet frame headers and creates labels for transmission on the control channel $\lambda_C$. A buffer 47' is arranged at the output of mapper 47 to store the timeslots and waits for a decision to send the respective timeslot. Buffer 48' stores the label corresponding to the timeslot to build the control channel. Controller 20 controls buffers 47', 48' with a trigger and a decision signal to send the new optical packet synchronously with bypassed traffic in pass-through direction.

The network interface portion 41 receives optical packet signals from the central switch matrix, which are fed via an O/E converter to a buffer 43. Data time slot processing unit 44 reads the data packets from memory 43 and formats them into timeslots for transmission in pass-through direction of the optical fiber. The corresponding packet header comes from header processor 45, which receives address and other header information from the central scheduler of the node. Again, trigger and a decision signals to send the new optical packet synchronously with bypassed traffic in pass-through direction comes from controller 20.

Under the control of controller 20, a switch 26 selects either the data output of client interface portion 42 or network interface portion 41 and feeds it to a multi-wavelength optical signal source 25, which modulates the preformatted electrical data onto appropriate carrier wavelengths to create a multi-colour optical packet that is fed within an assigned timeslot via a coupler 17 to the output optical fiber FO.

Signal source 25 can be implemented with an array of single wavelength cw lasers covering the full wavelength set of the WDM signal followed by a set of optical modulators, which modulate parallelized electrical signal onto an selected set of carrier wavelengths to create the optical packet. Alternatively, signal source can be implemented with tunable lasers to cover the required wavelength spectrum.

The corresponding header signals are selected by a switch 27 from either header processor 48' or 45, depending on whether the packet comes from the data output of client interface portion 42 or network interface portion 41 and are fed to controller 20, which inserts the header into the control channel $\lambda_C$. Through an E/O converter 22, which creates an optical signal of appropriate control channel wavelength, the control channel is coupled via coupler 18 to the output optical WDM signal.

Figure 4:
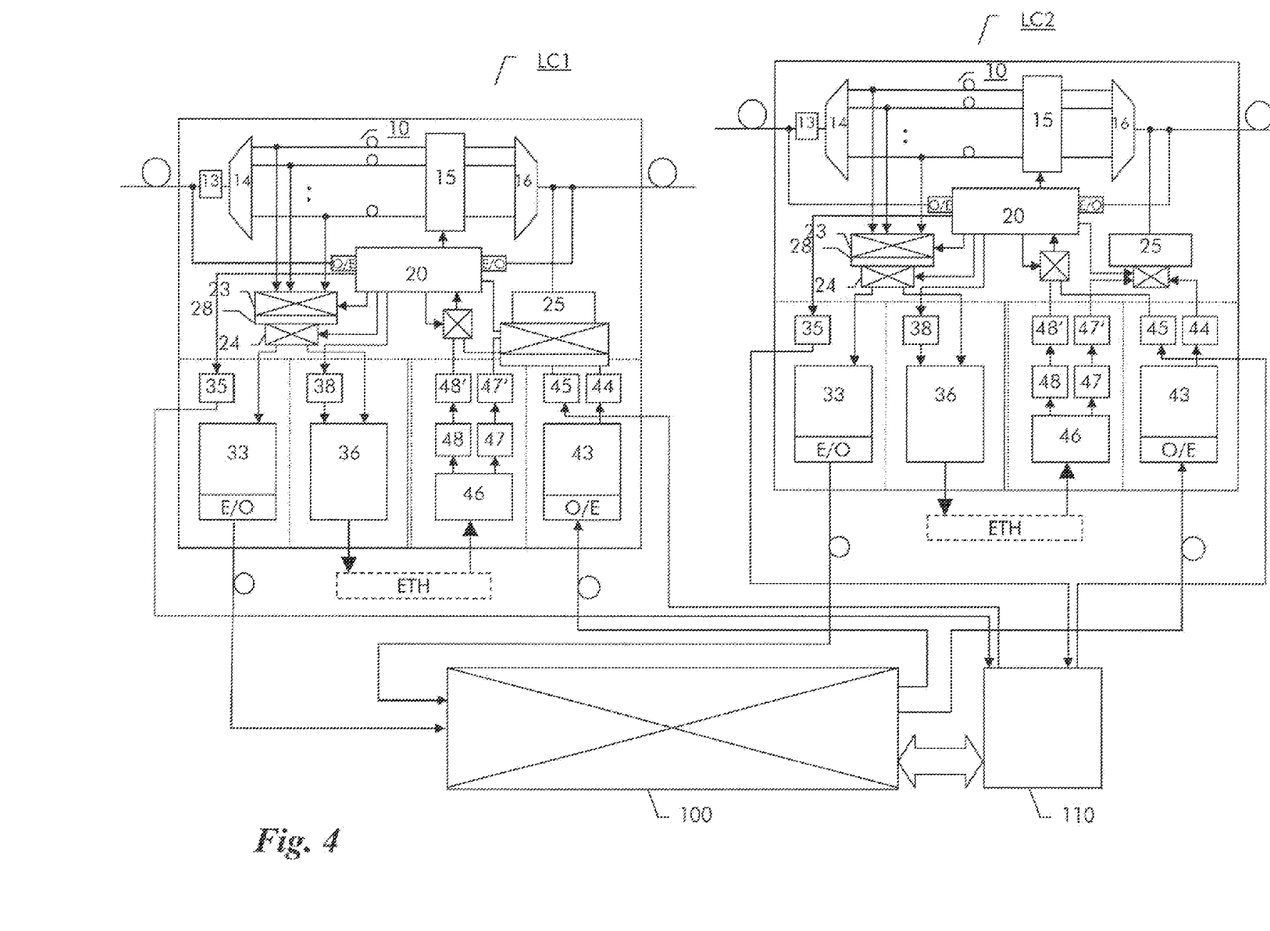
FIG. 4 shows a block diagram of the network node with two POADM line cards.

FIG. 4 shows two line cards LC1, LC2 interconnected through a central optical switch matrix 100. Switch matrix 100 receives optical burst signals from receiver sections 31 of line cards LC1, LC2, and is connected at its output side to transmitter sections 41 of line cards LC1, LC2, respectively. A scheduler 110 configures the switch matrix for each packet slot in accordance with optical header information received from header processing blocks 35 of the respective line card LC1, LC2 from which the corresponding optical burst comes. Scheduler 110 also forwards the header information to the transmit side header processor 45 of the corresponding line card LC1, CL2, to which the optical packet is switched.

Scheduler 110 receives the labels of the respective time slots and configures switch matrix 100 per timeslot. Scheduler 110 also identifies possible contentions and reacts on buffer memory 33 to store the time slots until there is a possibility to switch the time slot without collision.

Switch matrix 100 is a WDM switching fabric, which switches bands of wavelengths, and offers a switching capacity of several Tbit/s.

The time slots are arranged in the WDM domain in order to create a WDM packet with an internal multi-colour packet format. This WDM packet is switched in the optical domain to the correct output port and send to the transmit side buffer block 43.

Figure 5:
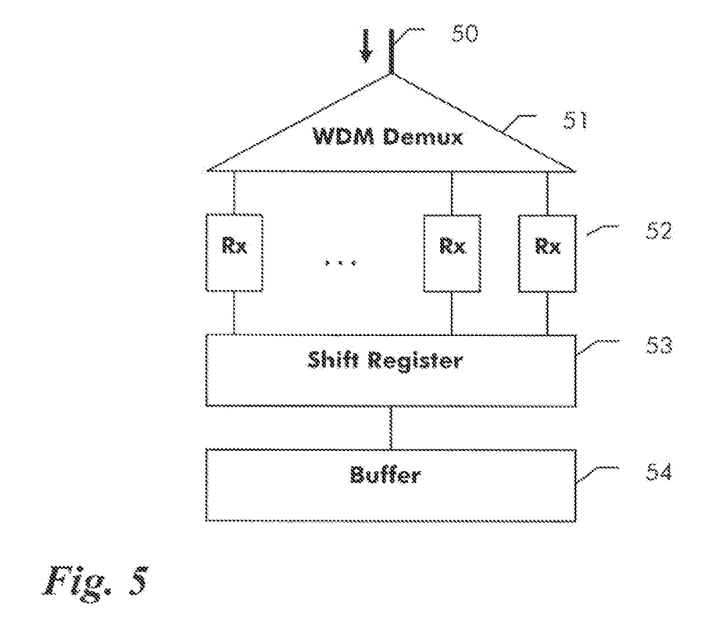
FIG. 5 shows the functional elements of a line card in receive direction.

FIG. 5 shows the functional elements of a line card in receive direction. The incoming WDM signal from a fiber 50 is fed to a WDM demultiplexer 51, which separates the individual wavelength channels from a wavelength sub-band and feeds these to individual optical receivers 52 per wavelength. Receivers 52 perform O/E conversion, sampling, and digital signal processing for dispersion compensation and clock/data recovery. The digital output signals of receivers 52 goes to a shift register 53, which performs parallel-to-serial conversion per wavelength group. The serialized output signal is then buffered in a buffer 54 to resolve contentions and resynchronize the packets onto common packet timeslots at switch matrix and transmit side. This resynchronization of packet timeslots at the line cards enables synchronous switching of optical packets in an asynchronous network concept.

Figure 6:
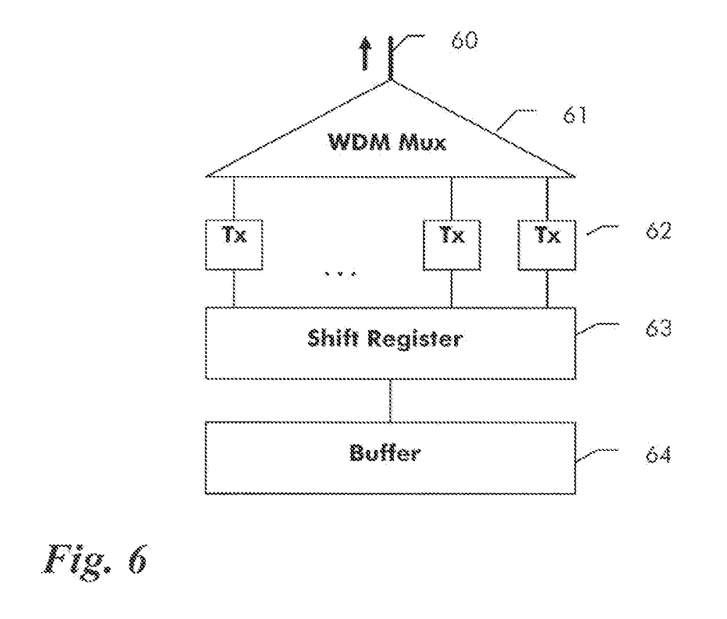
FIG. 6 shows the functional elements of a line card in transmit direction.

FIG. 6 shows the functional elements of a line card in transmit direction. Signal packets to be transmitted are buffered in a buffer 64. When a packet is scheduled for transmission, it is read from buffer 64 and fed to a shift register 63, which performs serial-to-parallel conversion. The parallelized signal goes to coloured wavelength optical transmitters 62, each transmitting at a different wavelength channel. The optical output of transmitters 62 is fed to a WDM multiplexer 61, which output is connected to an output side line fiber 60.

Figure 7:
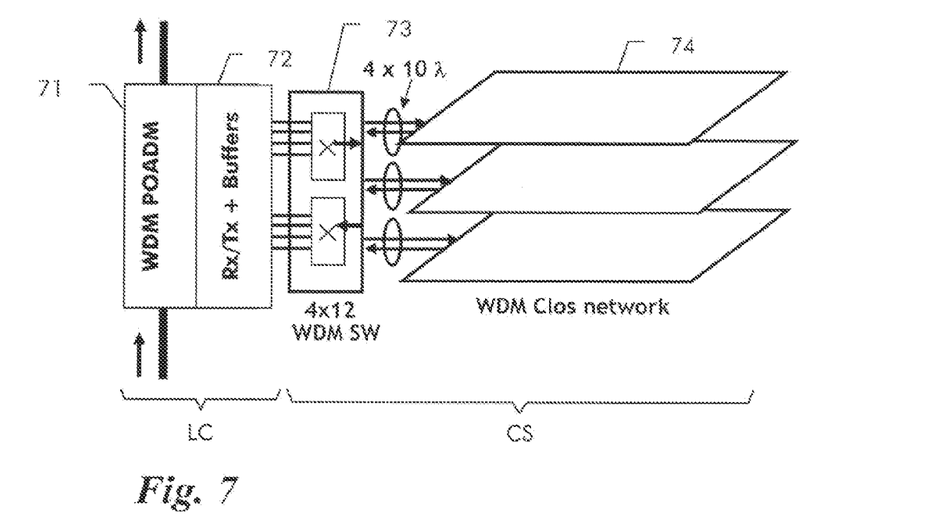
FIGS. 7 and 8 show an embodiment of an optical switch matrix.
Figure 8:
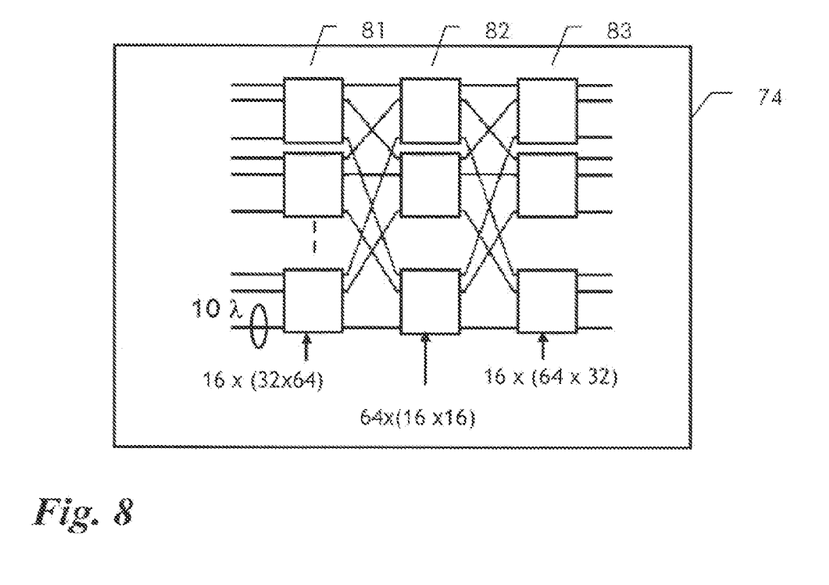

FIGS. 7 and 8 shows an embodiment of an optical switch matrix CS. As described before, the network node in an embodiment supports 80 signal wavelengths per fiber, each transporting data at 100 Gbit/s. A sub-band contains 10 wavelengths at 100 Gbit/s. Hence, there are 8 sub-bands of 10 wavelengths per fiber. The network node further supports that up to 50% of the pass-through capacity from each fiber can be dropped. The number of wavelengths that can therefore be processed on each line card is 40, which represents 4 groups of 10 wavelengths. For each group of wavelengths a dedicated internal optical interconnect is used between the line cards and the central switch.

In FIG. 7, a line card LC, which has a WDM POADM section 71 and a receiver/transmitter section 72 with associated buffer memories, is connected over four optical interconnects to central switch matrix CS. Each interconnect carries 10 wavelengths and thus allows to switch multi-colour optical packets between any of the line cards LC.

The switch matrix has three optical switching boards 74. A WDM 4×12 switch module 73 configurably connects the four optical interconnects to and from line card LC to any of the optical switching boards 74. Each of the optical switching boards carries a three stage optical Clos network, shown in FIG. 8. The Clos network has switching modules 81, 82, 83 arranged in three stages. Each switching module is an all-optical WDM switch. The first stage has 16 switches 81 with 32 inputs connectable to 64 outputs (i.e. 32×84), each.

The second stage has 64 switches with 16×16 inputs and outputs and the third stage has again 16 switches with 64 inputs to 32 outputs.

Figure 9:
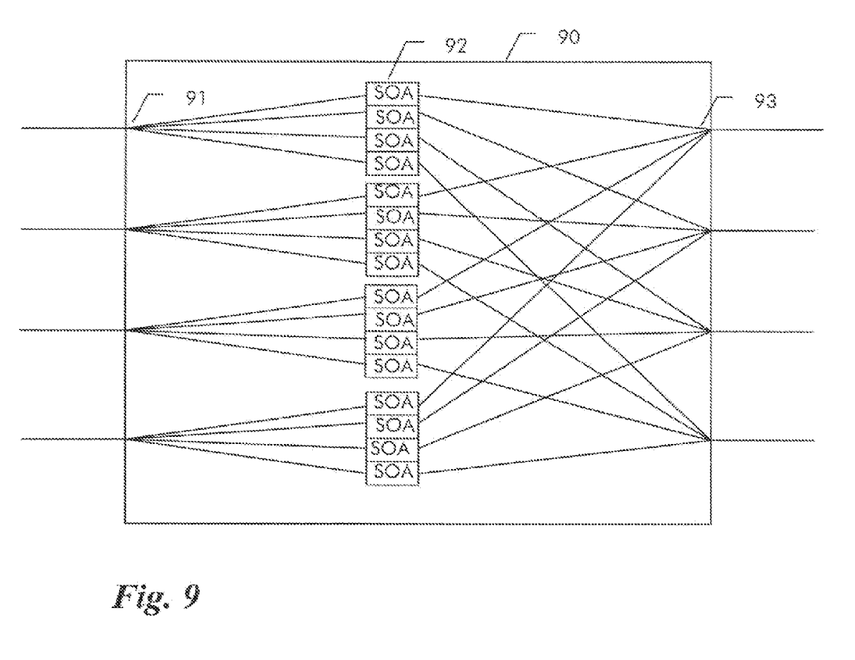
FIG. 9 shows a an all-optical WDM switch adapted for multi-colour optical packets.

A example for the implementation of an all-optical WDM switch is shown in FIG. 9 in the simplified case of a 4×4 switch. Optical switch module 90 has 4×4 inputs and outputs. At each input, a passive 1:4 splitter 91 splits the input signal into four, each of which goes to a semiconductor optical amplifier (SOA) 92 acting as an optical gate. At the output side, a passive optical coupler couples four signal lines, one from each of the four inputs, to each output. By selectively activating or deactivating the respective SOAs, each input can be connected to any output. Alternatively an optical space switch could be used for this purpose. Due to the associated insertion loss optical amplification might be needed.

The Clos network of the switch matrix can be designed and arranged to be modular. The switch matrix can then be sized with the number of installed line cards, so the architecture is fully modular.

The transport of the headers on a separate wavelength per fiber plus the adoption of a fixed WDM time slot makes the concept independent of the bit rate. Moreover, the node architecture allows to use line cards for signals of different modulation rate, modulation scheme etc, such as 10 Gb, 100 Gb, and 1 Tb line cards, since no changes would be necessary to the scheduler, the WDM POADMs, and the optical switches.

The scheduler is not impacted since the routing information is transported on a separate wavelength. Only the line cards have to be replaced to be able to support higher bit rates. In the subject embodiment, the network node supports up to 125 WDM POADMs in its full configuration.

Figure 10:
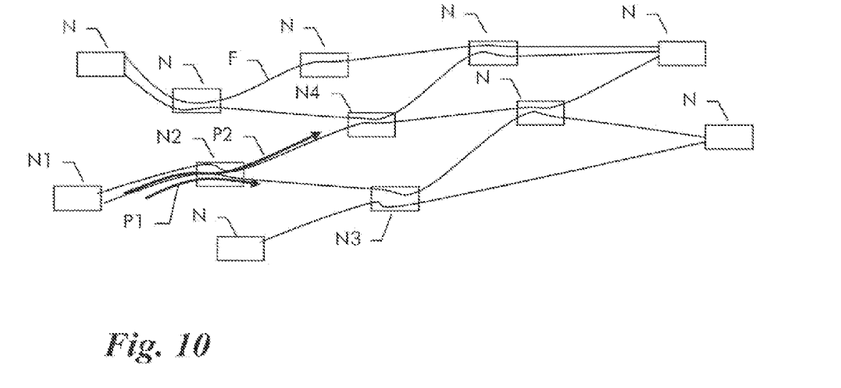
FIG. 10 shows a network application of the network node.

FIG. 10 shows a network application of the network node as described above. In the network, different network nodes N are physically interconnected through optical fibers F. Optical signals can either pass transparently through the POADM stage of each node, or can be interconnected through the network side interface portions and the central switch matrix of each node. The network operates at packet granularity with fixed length packet time slots and packet re-synchronization at each switching node.

For instance, an optical packet from node N1 can be forwarded transparently over path P1 to network node N3, or can be switched in a "opaque" way over path P2 to network node N4.

This concept introduces an optical transparent layer, operating at the packet granularity to bypass when possible the traffic that does not need to be processed. Optical transparency at the packet granularity for transit packets improves the end-to-end performance with respect to the latency as compared to a full electronic approach (which requires to pass through several buffers imposing their occupation ratio). The immanent reduction of the packet processing leads also a considerable reduction of the power consumption of the node.

One aspect of the above described embodiment therefore is the WDM POADM. The WDM POADM is an add/drop structure able to manage WDM packets independently of the bit rate per wavelength.

A second aspect of the described embodiment is the use of multi-colour WDM packets. An advantage of grouping wavelengths for a packet is a reduction of the number of optical components in path-through direction. The use of WDM packets eliminates a channel cascade of filters when crossing intermediate nodes for the traffic that stays optically transparent. In this case, only pass band filters are required in the intermediate nodes plus one unique filter in the edge node. The filtering constraint is therefore significantly reduced, which simplifies management of the channel spacing.

A further advantage of using WDM packets is the signal capacity. For example, if the wavelength bit rate is 10 G, then the packet has a 100 Gbit/s capacity over 10 wavelengths. If the bit rate per wavelength is 100 G, then the packet has 1 Tbit/s of capacity.

A third aspect of the described embodiment is the central switching fabric. The switching fabric includes an electronic part, i.e. the O/E and E/O conversion stages and the buffering physically arranged on the line cards, and the centralized optical switching elements.

The Clos-network architecture for the switch fabric itself allows to handle huge switching capacities while keeping the size of the elementary switch modules at a reasonable value. A speed up factor allows to limit the physical switch size to a fraction of the total capacity.

In a preferred improvement, a speed-up factor can be introduced for optical signals between the line cards and the central switch fabric. Such signals are only internal to the network node and do not have to travel over longer distances, so that signal distortion which limits the achievable data rate are low.

In the subject embodiment, a speed-up factor of 3 is used, i.e. internal signal are accelerated by a factor of 3 compared to the received signal speed. This reduces the load per switching plane and the buffer size.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A network node for an optical network, comprising:
a number of packet optical add drop multiplexers (POADMs) with an input and an output line interface to selectively add and drop optical packets into and from packet timeslots of output and input wavelength-multiplexed optical signals transmitted and received at said output and input line interfaces, respectively;
a number of dual line cards, respectively associated with said POADMs, to electrically process and buffer packets to be added and dropped, said number of dual line cards having a line interface portion for dropped packets to be forwarded on line interfaces associated with any other of said number of dual line cards and a client interface portion for packets to be added from or dropped at a client interface, wherein said line interface portion has an internal interface for said packets to be forwarded; and
a central switch matrix to configurably interconnect said internal interfaces of said number of dual line cards on a packet by packet basis, wherein said central switch matrix is an optical switch matrix, and wherein said internal interfaces are optical interfaces.

2. The network node according to claim 1, wherein said optical packets have a multi-wavelength packet format being transmitted in parallel using a group of wavelength channels, and wherein said POADMs are designed to add and drop said groups of wavelength channels per optical packet, and wherein said number of dual line cards are designed to convert said multi-wavelength packet format into a serial electrical packet format for processing and buffering.

3. The network node according to claim 1, wherein said optical packets comprise packet headers being transmitted on a dedicated control channel, and wherein said POADMs are designed to extract said control channel and re-insert a refreshed control channel, and wherein said network node comprises a controller to process said control channels and configure said POADMs in accordance with address information contained in said packet headers.

4. The network node according to claim 1, wherein said POADMs are integrated on said number of dual line cards.

5. The network node according to claim 1, wherein said POADMs comprise an optical pass-through section arranged between said network input and output, respectively, and wherein said pass-through section comprises a WDM demultiplexer to demultiplex received WDM signals into wavelength sub-bands and optical gates to selectively block individual optical packets in pass-through direction.

6. The network node according to claim 1, wherein said number of dual line cards provide an input-output queuing scheme for said central switch matrix.

7. The network node according to claim 1, wherein said central switch matrix is an all-optical WDM switching fabric adapted to switch bands of wavelengths.

8. The network node according to claim 7, further comprising a scheduler to configure said central switch matrix for each packet slot in accordance with optical header information received from header processors of line cards from which the corresponding optical packets come.

9. The network node according to claim 8, wherein said scheduler forwards header information to header processors at line cards to which the optical packet is switched.

10. The network node according to claim 8, wherein said scheduler is adapted to receive labels per time slots and to configure said central switch matrix per timeslot.

11. The network node according to claim 8, wherein said scheduler is adapted to identify contentions and to control selected lines cards to store said packets until a collision-free switching becomes possible.

12. The network node according to claim 1, wherein said number of dual line cards are adapted to internally increase the transmission rate of said optical packets to be switched through said optical switch matrix by a speed-up factor.

13. A method for a network node of an optical network, comprising:
selectively adding and dropping optical packets into and from packet timeslots of output and input wavelength-multiplexed optical signals transmitted and received at output and input line interfaces of a number of packet optical add drop multiplexers (POADMs);
electrically processing and buffering packets to be added and dropped via a number of dual line cards associated with said POADMs, said number of dual line cards having a line interface portion for dropped packets to be forwarded on line interfaces associated with any other of said number of dual line cards and a client interface portion for packets to be added from or dropped at a client interface, wherein said line interface portion has an internal interface for said packets to be forwarded; and
configurably interconnecting, via a central switch matrix, said internal interfaces of said number of dual line cards on a packet by packet basis, wherein said central switch matrix is an optical switch matrix, and wherein said internal interfaces are optical interfaces.

\* \* \* \* \*